United States Patent
Nishihashi et al.

(10) Patent No.: US 11,112,176 B2
(45) Date of Patent: Sep. 7, 2021

(54) FREEZE VACUUM DRYING APPARATUS AND FREEZE VACUUM DRYING METHOD

(71) Applicant: ULVAC, INC., Chigasaki (JP)

(72) Inventors: Tsutomu Nishihashi, Chigasaki (JP); Haruhisa Nakano, Chigasaki (JP); Hirohiko Murakami, Chigasaki (JP); Tsuyoshi Yoshimoto, Chigasaki (JP); Masaki Itou, Chigasaki (JP); Takumi Komiya, Chigasaki (JP)

(73) Assignee: ULVAC, INC., Chigasaki (JP)

( * ) Notice: Subject to any disclaimer, the term of this patent is extended or adjusted under 35 U.S.C. 154(b) by 0 days.

(21) Appl. No.: 17/107,297

(22) Filed: Nov. 30, 2020

(65) Prior Publication Data

US 2021/0080179 A1 Mar. 18, 2021

Related U.S. Application Data

(63) Continuation of application No. PCT/JP2019/013493, filed on Mar. 28, 2019.

(30) Foreign Application Priority Data

Jun. 8, 2018 (JP) .................. 2018-110092

(51) Int. Cl.
*F26B 5/06* (2006.01)
*A23L 3/00* (2006.01)
*A23L 3/44* (2006.01)

(52) U.S. Cl.
CPC .............. *F26B 5/065* (2013.01); *A23L 3/001* (2013.01); *A23L 3/44* (2013.01); *A23V 2002/00* (2013.01)

(58) Field of Classification Search
CPC .... F26B 5/065; F26B 5/06; A23L 3/46; A23L 3/44; A23L 3/001; A23V 2002/00
(Continued)

(56) References Cited

U.S. PATENT DOCUMENTS 3,228,838 A * 1/1966 Rinfret ................. A01N 1/0284
34/284
3,731,392 A 5/1973 Gottfried
(Continued)

FOREIGN PATENT DOCUMENTS

CN 101464091 A 6/2009
CN 203443286 U 2/2014
(Continued)

OTHER PUBLICATIONS

Office Action dated Jun. 15, 2020 in Chinese Application No. 201980004028.3.
(Continued)

*Primary Examiner* — John P McCormack
(74) *Attorney, Agent, or Firm* — Saliwanchik, Lloyd & Eisenschenk (57) ABSTRACT

A freeze vacuum drying apparatus includes: a spraying unit; a pipe unit; a heating unit; and a collection unit. The spraying unit sprays a raw material liquid into a vacuum chamber. The pipe unit has a non-linear shape, includes a first opening end and a second opening end, and traps frozen particles via the first opening end, the frozen particles being formed by self-freezing of liquid droplets formed by spraying the raw material liquid into the vacuum chamber. The heating unit heats the frozen particles in the pipe unit for sublimation drying, the frozen particles moving in the pipe unit from the first opening end toward the second opening end by kinetic energy produced during spraying. The collection unit collects dried particles that are formed by sublimation drying of the frozen particles in the pipe unit and released from the second opening end of the pipe unit.

9 Claims, 5 Drawing Sheets

(58) Field of Classification Search
USPC .............................................. 34/88, 287, 284
See application file for complete search history.

(56) References Cited

U.S. PATENT DOCUMENTS

| | | |
|---|---|---|
| 4,033,048 A | 7/1977 | Van Ike |
| 2011/0016742 A1* | 1/2011 | Anderson .................. A23L 3/44 |
| | | 34/287 |
| 2014/0230266 A1* | 8/2014 | Luy .......................... F26B 5/065 |
| | | 34/284 |

FOREIGN PATENT DOCUMENTS

| | | |
|---|---|---|
| CN | 206390193 U | 8/2017 |
| JP | 61-61601 A | 3/1986 |
| JP | 2002-310556 A | 10/2002 |
| JP | 2002-542926 A | 12/2002 |
| JP | 2006-90671 A | 4/2006 |
| JP | 2006-177640 A | 7/2006 |
| JP | 2014-119140 A | 6/2014 |
| WO | WO-2012/063678 A1 | 5/2012 |

OTHER PUBLICATIONS

International Search Report in International Application No. PCT/JP2019/013493, filed Mar. 28, 2019.

* cited by examiner

FIG.5

FREEZE VACUUM DRYING APPARATUS AND FREEZE VACUUM DRYING METHOD

CROSS REFERENCE TO RELATED APPLICATIONS

The present application is a continuation application of International Application No. PCT/JP2019/013493, filed Mar. 28, 2019, which claims priority to Japanese Patent Application No. 2018-110092, filed Jun. 8, 2018, the disclosures of each of which are incorporated herein by reference in their entirety.

BACKGROUND

In many freeze vacuum drying apparatuses, a raw material liquid is sprayed into a vacuum chamber, liquid droplets formed in the vacuum chamber are frozen, a frozen powder is collected in a collection tray, and heat is conducted to the collection tray to sublimate and dry the frozen powder. However, this approach takes a lot of time for sublimation drying in some cases because of the poor thermal conductivity between the frozen powder in a vacuum atmosphere.

Meanwhile, freeze vacuum drying for collectively drying a large amount of frozen powder in a short time has been proposed.

SUMMARY

However, in order to sublimate and dry a large amount of frozen powder in a short time, a high-frequency power source with a large capacity is required. In addition, drying of solvents released from a large amount of frozen powder in a short time requires a vacuum exhaust mechanism with a large flow rate. As described above, for the freeze vacuum drying apparatus, there may be a case where freeze vacuum drying of a large amount of frozen powder in a short time and cost reduction are contrary to each other.

In view of the circumstances as described above, it is an object of the present invention to provide a freeze vacuum drying apparatus and a freeze vacuum drying method that realize freeze vacuum drying in a short time and reduce costs.

In order to achieve the above-mentioned object, a freeze vacuum drying apparatus according to an embodiment of the present invention includes: a spraying unit; a pipe unit; a heating unit; and a collection unit.

The spraying unit sprays a raw material liquid into a vacuum chamber.

The pipe unit has a non-linear shape, includes a first opening end and a second opening end, and traps frozen particles via the first opening end, the frozen particles are formed by self-freezing of liquid droplets formed by spraying the raw material liquid into the vacuum chamber.

The heating unit sublimates and dries the frozen particles in the pipe unit by heating, the frozen particles move in the pipe unit from the first opening end toward the second opening end by kinetic energy produced during spraying.

The collection unit collects dried particles formed by sublimation drying of the frozen particles in the pipe unit and released from the second opening end of the pipe unit.

The pipe unit may have a turning axis in a direction from the spraying unit toward the collection unit and may spirally turn between the spraying unit and the collection unit.

In accordance with such a freeze vacuum drying apparatus, the raw material liquid is freeze-vacuum dried in the spiral pipe unit by the heating unit in a short time, and dried particles are collected in the collection unit. In the freeze vacuum drying apparatus, the apparatus becomes small in size, a large exhaust mechanism is not required, and a reduction in costs is realized.

In order to achieve the above-mentioned object, a freeze vacuum drying apparatus according to an embodiment of the present invention includes: a spraying unit; a pipe unit; a heating unit; and a collection unit.

The spraying unit sprays a raw material liquid into a vacuum chamber.

The pipe unit includes a first opening end and a second opening end, traps frozen particles formed by self-freezing of liquid droplets via the first opening end, is capable of turning the frozen particles, and the liquid droplets are formed by spraying the raw material liquid into the vacuum chamber.

The heating unit sublimates and dries the frozen particles in the pipe unit by heating, the frozen particles move in the pipe unit from the first opening end toward the second opening end by kinetic energy produced during spraying.

The collection unit collects dried particles formed by sublimation drying of the frozen particles in the pipe unit and released from the second opening end of the pipe unit.

In accordance with such a freeze vacuum drying apparatus, the raw material liquid is freeze-vacuum dried in the pipe unit by the heating unit in a short time, and dried particles are collected in the collection unit. In the freeze vacuum drying apparatus, the apparatus becomes small in size, a large exhaust mechanism is not required, and a reduction in costs is realized.

In the freeze vacuum drying apparatus, the pipe unit may include at least one opening capable of releasing a gas to an outside of the pipe unit, the gas is generated by sublimation drying of the frozen particles between the first opening end and the second opening end while the frozen particles moving in the pipe unit.

In accordance with such a freeze vacuum drying apparatus, since the pipe unit includes the at least one opening that releases the gas to the outside of the pipe unit, it is possible to efficiently release water vapor to the outside of the pipe unit, the water vapor being released by sublimation drying of the frozen particles.

In the freeze vacuum drying apparatus, the pipe unit may be formed of a gas-permeable resin.

In accordance with such a freeze vacuum drying apparatus, the dried gas is efficiently released to the outside of the pipe unit.

In the freeze vacuum drying apparatus, the heating unit may include a heating mechanism that heats the frozen particles with a high frequency.

In accordance with such a freeze vacuum drying apparatus, the ice-part of the frozen particles absorbs the high frequency, resulting in efficient sublimation drying of the frozen particles.

In the freeze vacuum drying apparatus, the heating unit may include a heating mechanism that heats the frozen particles by thermal radiation.

In accordance with such a freeze vacuum drying apparatus, the ice-part of the frozen particles is heated by thermal radiation, resulting in efficient sublimation drying of the frozen particles.

In the freeze vacuum drying apparatus, the heating unit may include a plurality of units, and each of the plurality of units may independently be capable of heating the frozen particles.

In accordance with such a freeze vacuum drying apparatus, it is possible to independently change the electric power to be input to the pipe unit from the heating unit depending on the position of the pipe unit.

The freeze vacuum drying apparatus may further include a transport mechanism capable of replacing the collection unit with another collection unit.

In accordance with such a freeze vacuum drying apparatus, a large amount of dried particles can be obtained with one apparatus even after the dried particles are collected in one collection unit, because the one collection unit is exchanged with another collection unit.

Figure 1:
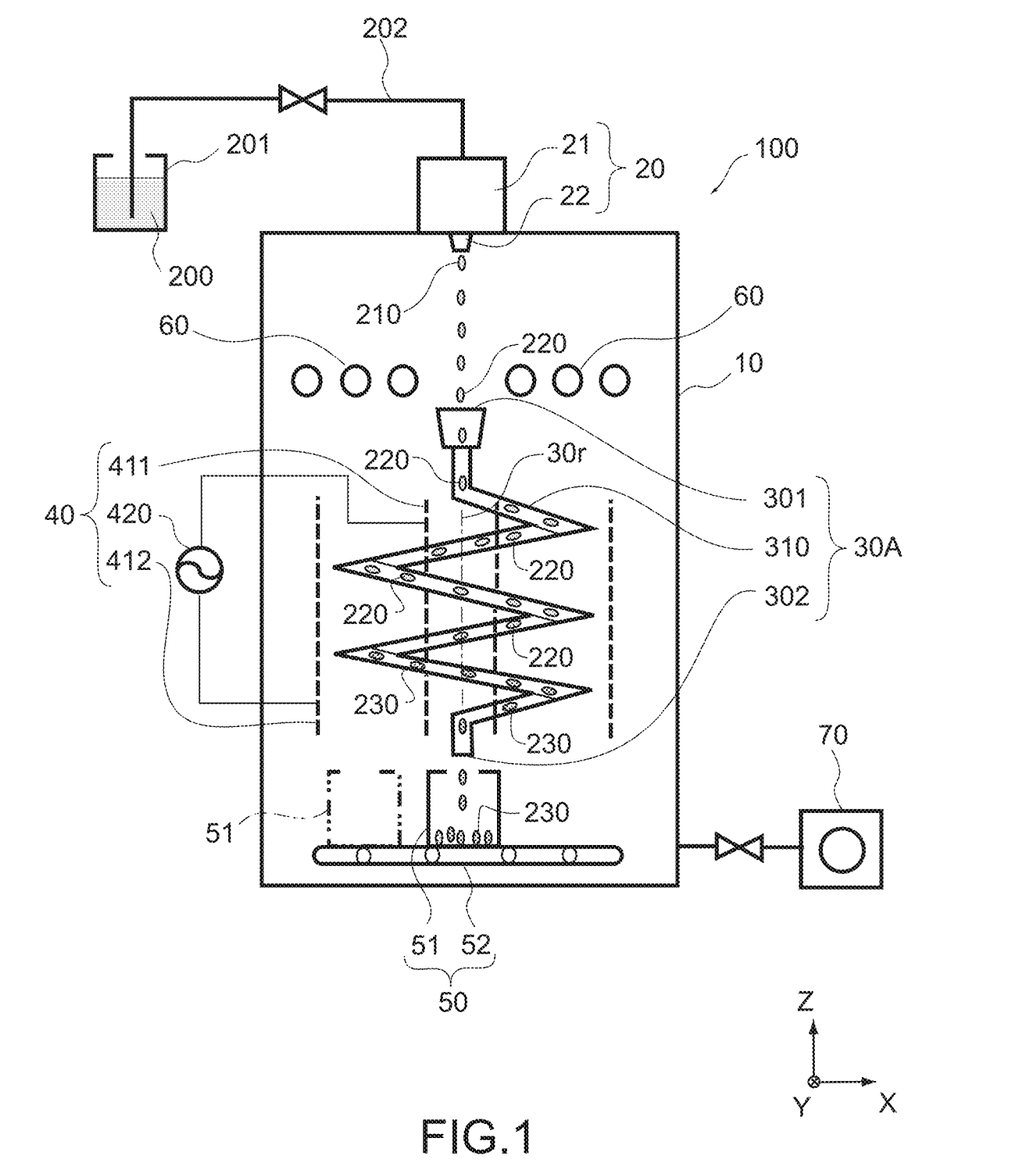

In order to achieve the above-mentioned object, a freeze vacuum drying method according to an embodiment of the present invention includes: a raw material liquid is sprayed into a vacuum chamber;

a pipe unit having a non-linear shape is used, the pipe unit includes a first opening end and a second opening end to trap frozen particles formed by self-freezing of liquid droplets via the first opening end, the pipe unit has a turning axis in a direction from the first opening end toward the second opening end and turns spirally between the first opening end and the second opening end, and the liquid droplets are formed by spraying the raw material liquid into the vacuum chamber;

the frozen particles are sublimated and dried in the pipe unit by heating, the frozen particles move in the pipe unit from the first opening end toward the second opening end by kinetic energy produced during spraying; and dried particles formed by sublimation drying of the frozen particles in the pipe unit and released from the second opening end of the pipe unit are collected.

In accordance with such a freeze vacuum drying method, the raw material liquid is freeze-vacuum dried in the pipe unit having a non-linear shape by the heating unit in a short time, and dried particles are collected in the collection unit. In the freeze vacuum drying apparatus, the apparatus becomes small in size, a large exhaust mechanism is not required, and a reduction in costs is realized.

BRIEF DESCRIPTION OF DRAWINGS

FIG. 1 is a schematic side view showing a freeze vacuum drying apparatus according to this embodiment;

FIG. 2(*a*) is a simulated diagram showing the relationship between the moving time of frozen particles (the horizontal axis) and the temperature of the frozen particles (the left vertical axis), and the relationship between the moving time of the frozen particles and the weight of the frozen particles (the right vertical axis). FIG. 2(*b*) is a simulated diagram showing the relationship between the moving time of the frozen particles (the horizontal axis) and the velocity of the frozen particles (the left vertical axis), and the relationship between the moving time of the frozen particles and the number of turnings of the frozen particles (the right vertical axis);

FIG. 3 is a schematic diagram showing a modified example 1 of the freeze vacuum drying apparatus according to this embodiment;

FIG. 4 is a schematic side view showing a modified example 2 of the freeze vacuum drying apparatus according to this embodiment; and FIG. 5 is a schematic side view showing a modified example 3 of the freeze vacuum drying apparatus according to this embodiment.

DETAILED DESCRIPTION OF EMBODIMENTS

Hereinafter, an embodiment of the present invention will be described with reference to the drawings. In each drawing, XYZ axis coordinates is introduced in some cases. Further, the same members or members having the same function are denoted by the same reference symbols, and description of the members is appropriately omitted after the description.

FIG. 1 is a schematic side view showing a freeze vacuum drying apparatus according to this embodiment. In this embodiment, the up-and-down direction of a freeze vacuum drying apparatus 100 is defined as the Z-axis direction, the lateral direction is defined as the X-axis direction, and the front-rear direction is defined as the Y-axis direction.

The freeze vacuum drying apparatus 100 shown in FIG. 1 includes a vacuum chamber 10, a spraying unit 20, a pipe unit 30A, a heating unit 40, a collection unit 50, a cooling trap 60, an exhaust mechanism 70, and a raw material container 201. In the freeze vacuum drying apparatus 100, the pipe unit 30A and the heating unit 40 are disposed between the spraying unit 20 and the collection unit 50. In this embodiment, the side of the spraying unit 20 is defined as the upper side, and the side of the collection unit 50 is defined as the lower side.

The vacuum chamber 10 is maintained in a reduced-pressure atmosphere of 500 Pa or less, favorably 100 Pa or less, by the exhaust mechanism 70. In the vacuum chamber 10 maintained in such a reduced-pressure atmosphere, the phase of water becomes one of the solid (ice) phase and the gas (water vapor) phase at a temperature of 70 K (Kelvin) or higher as seen from the phase equilibrium diagram of water. In other words, in the vacuum chamber 10 in this embodiment, liquid (water) is difficult to exist and a solid (ice) or a gas (water vapor) is present in the environment.

The spraying unit 20 includes a body portion 21 and a nozzle portion 22. The spraying unit 20 sprays a raw material liquid 200 stored in the raw material container 201 into the vacuum chamber 10 as a liquid droplet 210. For example, the raw material liquid 200 stored in the raw material container 201 is supplied to the body portion 21 via the pipe 202. The raw material liquid 200 supplied to the body portion 21 is sprayed as the liquid droplet 210 from the nozzle portion 22 into the vacuum chamber 10. The hole diameter of the injection port of the nozzle portion 22 is, for example, 50 μm or more and 400 μm or less. The spray pressure is 0.3 MPa or less. Examples of the raw material liquid 200 include powdered food, powdered drink, and medicine dispersed in a solvent such as water.

The distance between the nozzle portion 22 and an opening end 301 (first opening end) of the pipe unit 30A is at least 300 mm. For example, the liquid droplet 210 falls in a row in the direction from the spraying unit 20 toward the pipe unit 30A, and is self-frozen prior to falling to the opening end 301 of the pipe unit 30A. That is, the liquid is discharged from the spraying unit 20 in a columnar shape, and then is changed to the columnar liquid droplet 210 by the effect of the surface tension of the liquid. This liquid droplet 210 is deprived of the heat of vaporization, and thus is self-frozen. For example, the liquid droplet 210 is self-frozen at a position of 300 mm downward from the leading end of the nozzle portion 22 to form frozen particles 220. The frozen particles 220 formed by self-freezing of the liquid droplet 210 fall to the opening end 301 of the pipe unit 30A. The frozen particles 220 formed by self-freezing of the liquid droplet 210 prior to falling to the opening end 301 fall from the spraying unit 20 to the pipe unit 30A in a row. The average particle diameter of the frozen particles 220 is 100 μm or more and 600 μm or less.

The pipe unit 30A is disposed between the spraying unit 20 and the collection unit 50. The pipe unit 30A is formed in not a linear shape but a non-linear shape in the Z-axis direction. For example, as shown in FIG. 1, the pipe unit 30A includes a spiral axis 30r in the direction from the spraying unit 20 toward the collection unit 50, and spirally turns between the spraying unit 20 and the collection unit 50. The pipe unit 30A only needs to have a non-linear shape, and may have a meandering shape, for example.

The pipe unit 30A having a spiral shape includes a body portion 310, and the opening end 301 and an opening end 302 (second opening end) at both ends of the body portion 310. The opening end 301 is located directly below the nozzle portion 22. The pipe unit 30A traps, via the opening end 301, the frozen particles 220 formed by self-freezing of the liquid droplet 210. The inlet in the vicinity of the opening end 301 has a tapered structure whose inner diameter increases toward the spraying unit 20, as shown in the figure. As a result, the frozen particles 220 falling toward the opening end 301 are reliably trapped in the pipe unit 30A.

The frozen particles 220 trapped in the pipe unit 30A move in the pipe unit 30A from the opening end 301 to the opening end 302 without being scattered to the outside of the pipe unit 30A by kinetic energy produced when the liquid droplet 210 is sprayed. Further, in this configuration in which the spraying unit 20 is disposed on the upper side and the collection unit 50 is disposed on the lower side, also a gravitational force acts on the frozen particles 220. That is, the frozen particles 220 move in the pipe unit 30A from the opening end 301 toward the opening end 302 by kinetic energy produced when the liquid droplet 210 is sprayed or the or gravitational force.

Thus, the frozen particles 220 do not fall linearly from the position of the opening end 301 to the position of the opening end 302, but detour from the position of the opening end 301 to reach the position of the opening end 302 due to the presence of the body portion 310 having a spiral shape.

The heating unit 40 heats the frozen particles 220 in the pipe unit 30A for sublimation drying, the frozen particles 220 moving in the pipe unit 30A from the opening end 301 toward the opening end 302 by kinetic energy produced during spraying. In the example of FIG. 1, the heating unit 40 includes a heating mechanism that heats the frozen particles 220 by a high frequency. For example, the heating unit 40 includes an internal electrode 411, an external electrode 412, and a high-frequency power source 420.

The internal electrode 411 is, for example, a cylindrical mesh-electrode, and is disposed inside the pipe unit 30A. The central axis of the internal electrode 411 coincides with the spiral axis 30r of the pipe unit 30A. The external electrode 412 is, for example, a cylindrical mesh-electrode, and is disposed outside the pipe unit 30A. The central axis of the external electrode 412 coincides with the spiral axis 30r of the pipe unit 30A.

The high-frequency power source 420 applies a high-frequency electric field between the internal electrode 411 and the external electrode 412. For example, in the case where a positive potential is applied to the internal electrode 411 by the high-frequency power source 420, a ground potential (or a negative potential) is applied to the external electrode 412. In the case where a positive potential is applied to the external electrode 412, a ground potential (or a negative potential) is applied to the internal electrode 411. Since the body portion 310 of the pipe unit 30A is sandwiched between the internal electrode 411 and the external electrode 412, the high-frequency electric field spreads uniformly over the body portion 310.

For example, in the case where the solvents of the raw material liquid 200 is water, the high frequency emitted from the high-frequency power source 420 is selected from the range of 200 kHz to 13.56 MHz. The high-frequency electric field having such a frequency is efficiently absorbed by ice (water crystal) of the frozen particles 220. As a result, the ice-part of the frozen particles 220 is selectively warmed. Therefore, the-ice part of the frozen particles 220 turns into water vapor to sublimate and dry in the pipe unit 30A, and dried particles 230 obtained by removing the ice from the frozen particles 220 are formed in the pipe unit 30A. Further, since an alternating electric field is applied to the moving fine particles, uniform heating can be realized as compared with the processing on the bulk fine particles deposited on the container, the tray, or the like. In particular, in the case where a high-frequency power source having a low penetration depth is used, a remarkable effect can be achieved.

The water vapor generated in the pipe unit 30A is released from the opening end 301 or the opening end 302 and trapped by the cooling trap 60 in the vacuum chamber 10. Further, since the internal electrode 411 and the external electrode 412 are mesh-electrodes, the water vapor is capable of passing through each of the internal electrode 411 and the external electrode 412, and stagnation within the electrodes is suppressed. Note that although the cooling trap 60 is provided in the vicinity of the opening end 301 in the example of FIG. 1, the cooling trap 60 may be disposed in the vicinity of the opening end 302. The cooling trap 60 may be disposed in the vicinity of each of the opening end 301 and the opening end 302.

The dried particles 230 formed in the pipe unit 30A by sublimation drying are released from the opening end 301 of the pipe unit 30A by the effect of its own kinetic energy or gravitational force. The dried particles 230 released from the opening end 301 falls into the collection unit 50 located below the opening end 301 and collected in this collection unit 50.

The collection unit 50 includes, for example, a collection container 51 and a transport mechanism 52. The transport mechanism 52 is capable of replacing the collection container 51 located below the opening end 302 with another collection container 51. For example, in the case where a predetermined amount of the dried particles 230 is collected in one collection container 51, a new collection container 51 is disposed below the opening end 301 by the transport mechanism 52. The dried particles 230 are collected in this new collection container 51. That is, in the freeze vacuum drying apparatus 100, the operation of collecting a large amount of the dried particles 230 can be performed for a long time.

As the material of the pipe unit 30A, a resin having the minimum frictional coefficient with the contacted frozen powder is desirable. In addition, it is desirable to apply a gas-permeable resin through which gas (vapor) is easily permeated during drying. The adhesion of a resin to ice is approximately ⅒ the adhesion of a metal to ice, and using the pipe unit 30A formed of a resin makes the frozen particles 220 difficult to adhere to the inner wall of the pipe unit 30A. Further, in ice, as the temperature increases, the adhesion force to the resin tends to decrease. For this reason, it is difficult for the frozen particles 220 to adhere to the inner wall of the pipe unit 30A by heating the frozen particles 220 with the heating unit 40. Further, the frozen particles 220 receive a recoil force in a direction opposite to a direction in which the water molecules are released from the water molecules when water molecules are released from the frozen particles 220, then it makes the frozen particles 220 difficult to adhere to the inner wall of the pipe unit 30A. Note that, vibration such as ultrasonic waves may be applied to the pipe unit 30A in order to reliably suppress adhesion of the frozen particles 220 to the pipe unit 30A.

Figure 2A:
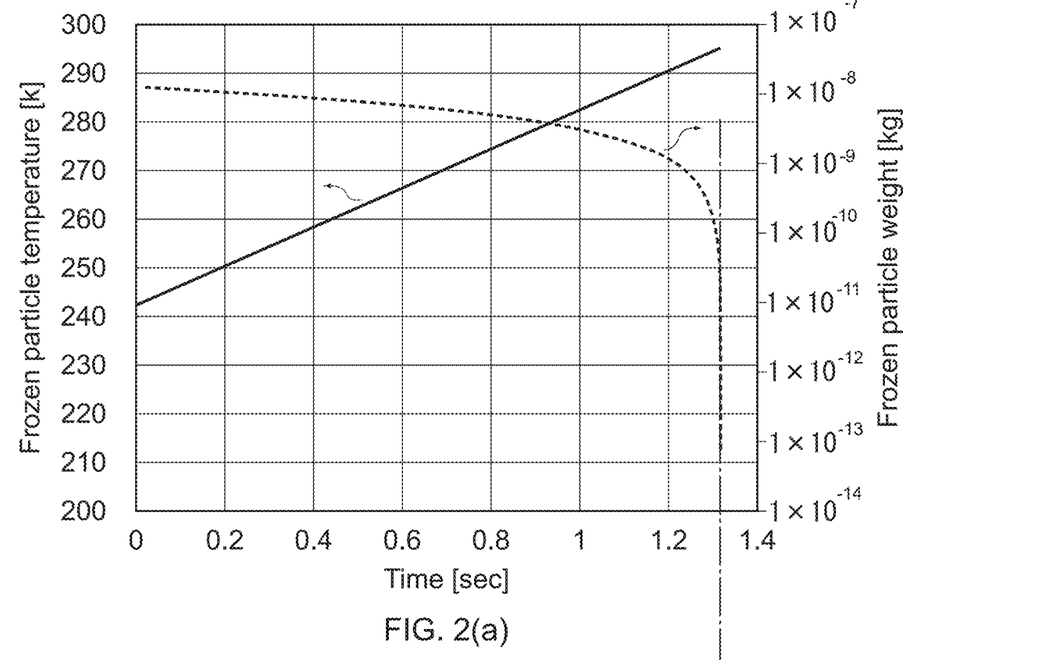
Figure 2B:
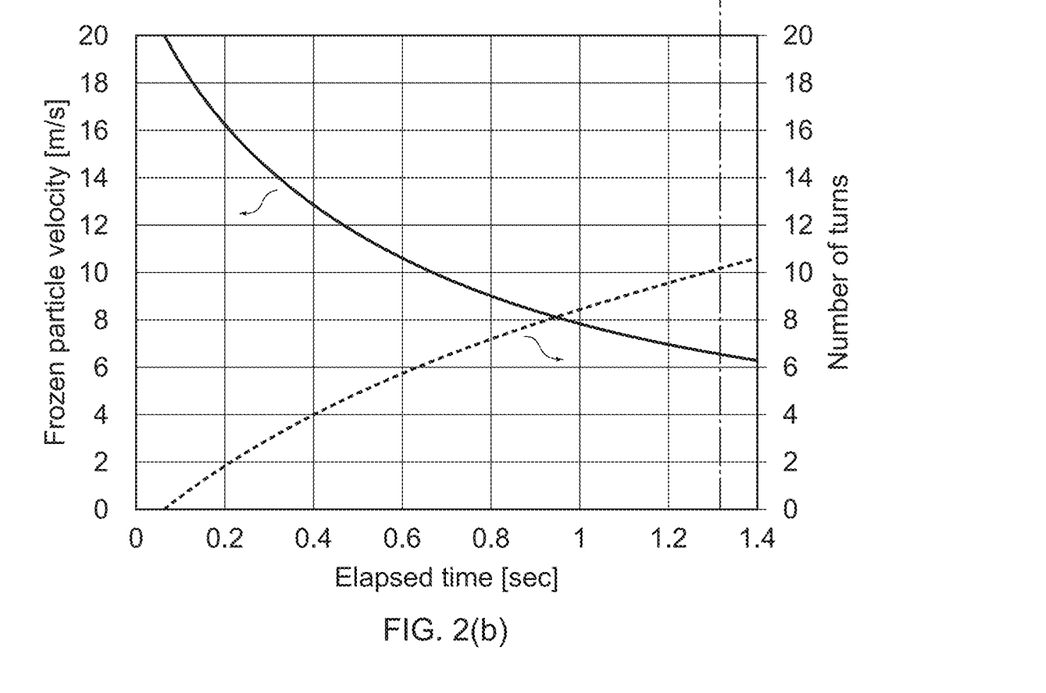

FIG. 2(*a*) is a simulated diagram showing the relationship between the moving time of frozen particles (the horizontal axis) and the temperature of the frozen particles (the left vertical axis), and the relationship between the moving time of the frozen particles and the weight of the frozen particles (the right vertical axis). FIG. 2(*b*) is a simulated diagram showing the relationship between the moving time of the frozen particles (the horizontal axis) and the velocity of the frozen particles (the left vertical axis), and the relationship between the moving time of the frozen particles and the number of turnings of the frozen particles (the right vertical axis). Here, as an example, the particle diameter of the frozen particles 220 is 300 μm, and the spiral diameter of the pipe unit 30A is 0.4 m, and the electric power to be supplied to the pipe unit 30A is 38 W. Further, the left end of the horizontal axis corresponds to the position of the upper end of the internal electrode 411 (or the external electrode 412).

As shown in FIG. 2(*a*), when the frozen particles 220 collected in the pipe unit 30A are heated by the heating unit 40 while moving through the pipe unit 30A, the temperature of the frozen particles 220 increases with the moving time of the frozen particles 220. Then, when the moving time reaches 1.3 seconds, the weight of the heating unit 40 decreases rapidly. This means that the ice parts are removed from the frozen particles 220 and the frozen particles 220 turn into the dried particles 230, resulting in sudden reduction in weight.

Meanwhile, as shown in FIG. 2(*b*), although the velocity of the frozen particles 220 has been initially 20 m/sec, the velocity of the frozen particles 220 is gradually reduced as the moving time increases and drops to 6.5 m/sec at the time when the weight drops sharply. This is because the frozen particles 220 receive a frictional load from the pipe unit 30A as the frozen particles 220 move in the pipe unit 30A having a spiral shape. However, even at the time when the weight of the frozen particles 220 is sharply reduced, the velocity of the frozen particles 220 still remain at 6.5 m/sec, which represents that the frozen particles 220 do not stop inside the pipe unit 30A.

Further, the number of turnings of the frozen particles 220 increases as the moving time of the frozen particles 220 elapses. This corresponds to that a travel distance of the frozen particles 220 comes to be longer. For example, it can be seen that 10 turnings are required for the weight of the frozen particles 220 to be rapidly reduced, i.e., for the frozen particles 220 to turn into the dried particles 230. In other words, it can be seen that the frozen particles 220 reliably turn into the dried particles 230 by turning the body portion 310 of the pipe unit 30A ten times or more when the spiral diameter of the pipe unit 30A is set to 0.4 m.

In a prior freeze vacuum drying apparatus, for example, a method of lyophilizing the raw material liquid 200 in the vacuum chamber 10 is adopted. In the prior method, frozen particles are directly recovered to the collection container 51 not via the pipe unit 30A, and the frozen particles are dried by a thermally conductive system in a support supporting the collection container 51. In this prior method, it has been found that, for example, one hour of drying will generate 9 liters of gas and 6.4 kW is required as electric power in the case where dried particles are formed after 10 liters of the raw material liquid 200 (concentration: 10 vol %) are lyophilized in the vacuum chamber 10 (pressure: maintaining 10 Pa), and frozen particles are collected in the collection container 51.

On the other hand, in the case of using the freeze vacuum drying apparatus 100, it has been found that frozen particles each having a diameter of 200 μm are sprayed at a dropping rate of 20 m/sec and dried in approximately 1 sec, the gas generation amount is $6.3\times10^{-7}$ ($m^3$/sec), and the required electric power is approximately 1.6 kW.

Figure 3:
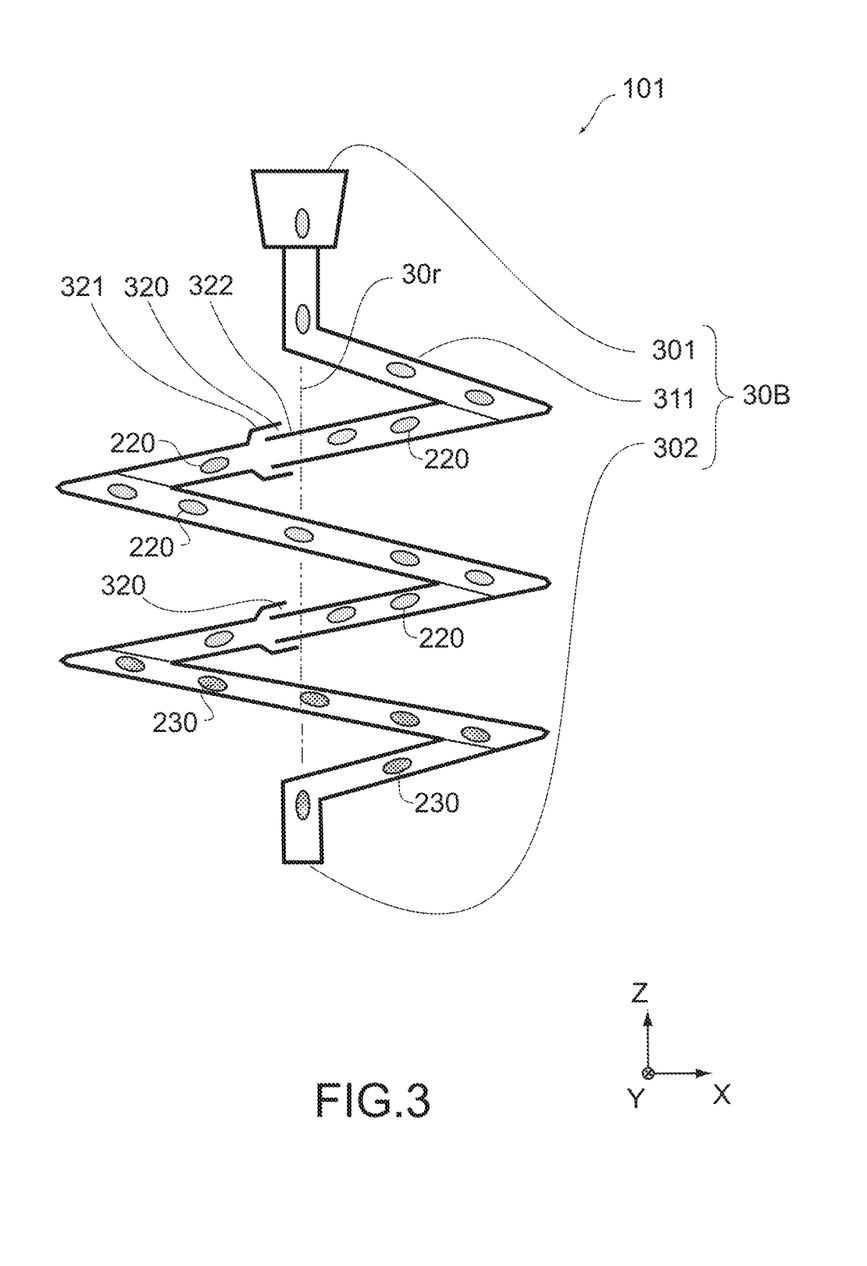

As described above, in accordance with the freeze vacuum drying apparatus 100, the frozen particles 220 formed by self-freezing of the liquid droplet 210 sprayed into the vacuum chamber 10 are guided into the pipe unit 30A having a non-linear shape and sublimated and dried in the pipe unit 30A by the heating unit 40. Then, the frozen particles 220 turn into the dried particles 230 in the pipe unit 30A, and the dried particles 230 are collected in the collection unit 50.

That is, in the freeze vacuum drying apparatus 100, the frozen particles 220 do not fall directly into the collection unit 50, detour due to the pipe unit 30A having a non-linear shape before being collected in the collection unit 50, and are heated by the heating unit 40 during long-distance travel. Then, the frozen particles 220 are efficiently sublimated and dried since a high-frequency electric field of a frequency band absorbed by ice is used as the heating method. The drying time is within several seconds. Further, the heating electric power is also suppressed low.

Therefore, the raw material liquid 200 is freeze-vacuum dried in a short time, and a large amount of the dried particles 230 can be obtained by replacing the collection container 51 one by one in the freeze vacuum drying apparatus 100. In addition, the apparatus can be miniaturized in the freeze vacuum drying apparatus 100, and a large-sized exhaust mechanism 70 is not required. As a result, cost reduction is realized.

For example, the length of the pipe unit 30A that has the spiral diameter of 0.4 m and has turned 10 times is approximately 10 m. In order to achieve the same effect as the freeze vacuum drying apparatus 100 without using the pipe unit 30A having a non-linear shape, it is necessary to make the distance between the spraying unit 20 and the collection unit 50 approximately 10 m. This is because the frozen particles 220 turn into the dried particles 230 by moving by 10 m. Thereby, in such an apparatus configuration, the apparatus becomes large in size and a large exhaust mechanism is required, resulting in an increase in costs.

Further, the scattering of the frozen particles 220 in the vacuum chamber 10 is suppressed since frozen particles 220 move through the pipe unit 30A during sublimation drying in the freeze vacuum drying apparatus 100. In addition, the scattering of the dried particles 230 from the collection container 51 is less likely to occur since the dried particles 230 are collected in the collection container 51 after the frozen particles 220 are dried. This improves the collection rate of the dried particles 230. In contrast, there is a possibility that the frozen particles 220 scatter from the tray into the vacuum chamber 10 by receiving the recoil of water vapor and the flow of gases out of the frozen particles 220 in the case where the frozen particles 220 are housed in a tray and the frozen particles 220 are dried in a support supporting the tray by a thermally conductive system for example.

Next, a modified example of the freeze vacuum drying apparatus will be described.

Modified Example 1

FIG. 3 is a schematic diagram showing a modified example 1 of the freeze vacuum drying apparatus according to this embodiment. FIG. 3 illustrates a pipe unit 30B of a freeze vacuum drying apparatus 101 according to the modified example 1. The configuration of the freeze vacuum drying apparatus 101 other than the pipe unit 30B is the same as that of the freeze vacuum drying apparatus 100.

In the pipe unit 30B, at least one opening 320 is provided between the opening end 301 and the opening end 302. The opening 320 is constructed by inserting a second joint portion 322 into a first joint portion 321, the first joint portion 321 being provided on a part of the pipe unit 30B and having an inner diameter larger than the outer diameter of the pipe unit 30B, the second joint portion 322 being provided on part of the pipe unit 30B and facing the first joint portion 321. The first joint portion 321 is located downstream of the second joint portion 322.

The opening 320 is formed by providing a gap between the first joint portion 321 and the second joint portion 322. The opening 320 releases gases (e.g., water vapor) generated by sublimation drying of the frozen particles 220 while moving through the pipe unit 30B.

Further, a filtering member may be provided between the first joint portion 321 and the second joint portion 322, the filtering member releasing only gas (water vapor) to the outside of the pipe unit 30B and no frozen particles 220 to the outside of the pipe unit 30B. The filtering member is formed of, for example, a metal mesh, a porous material, or the like.

In accordance with the freeze vacuum drying apparatus 101, since the pipe unit 30B includes at least one opening 320 that release gas to the outside of the pipe unit 30B, water vapor released by sublimation drying of the frozen particles 220 in the pipe unit 30B is efficiently released to the outside of the pipe unit 30B. This further reduces the drying time. Further, since the water vapor pressure in the pipe unit 30B is lower than the water vapor pressure in the pipe unit 30A, plasmas formed by ionizing water vapor by a high-frequency electric field in the pipe unit 30B are less likely to be generated.

Modified Example 2

Figure 4:
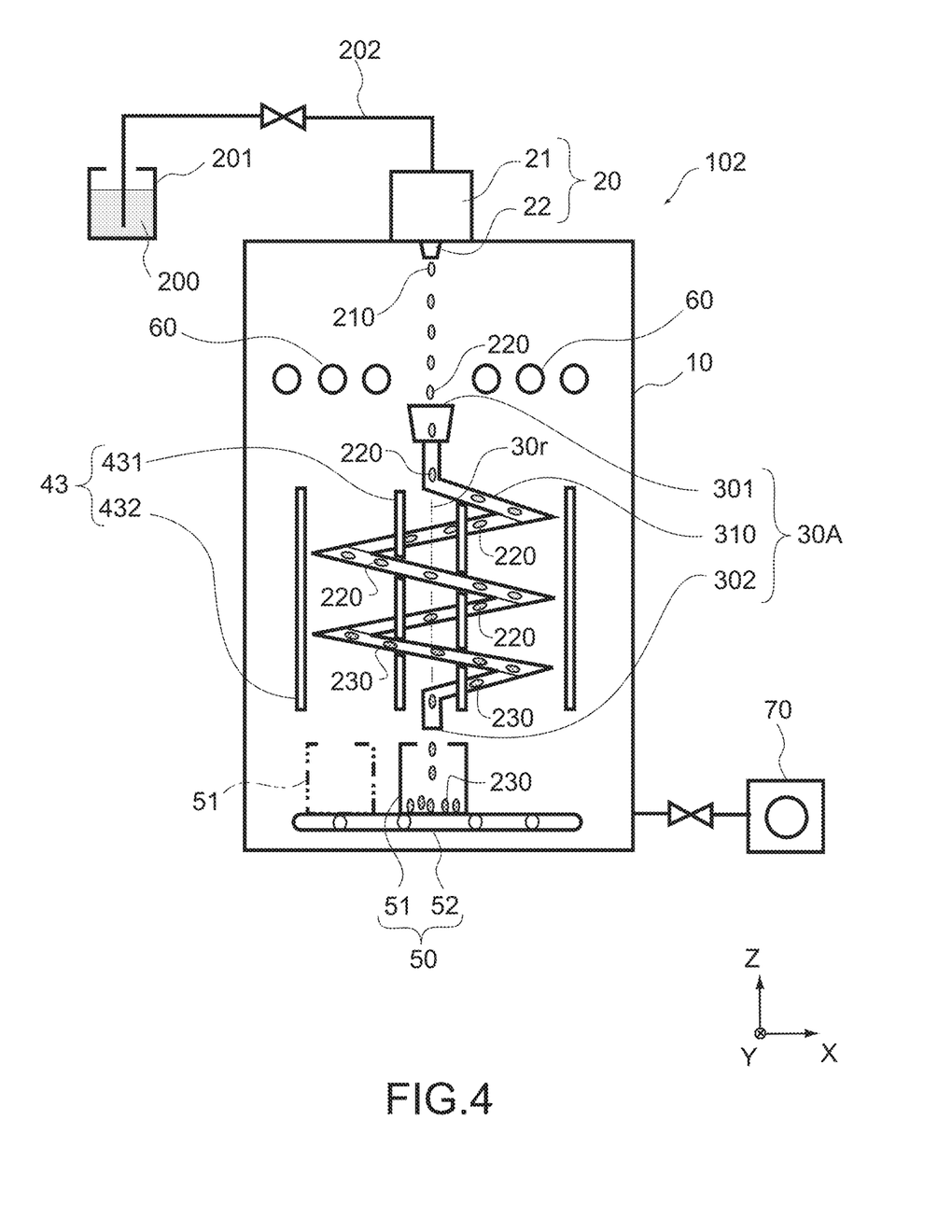

FIG. 4 is a schematic side view showing a modified example 2 of the freeze vacuum drying apparatus according to this embodiment.

In a freeze vacuum drying apparatus 102 shown in FIG. 4, the heating unit 43 includes a heating mechanism that heats the frozen particles 220 by thermal radiation. For example, the heating unit 43 includes an internal heater 431 and an external heater 432. The pipe unit 30A may be replaced with the pipe unit 30B.

The internal heater 431 has, for example, a cylindrical shape, and is disposed inside the pipe unit 30A. The central axis of the internal heater 431 coincides with the spiral axis 30r of the pipe unit 30A. The external heater 432 has, for example, a cylindrical shape, and is disposed outside the pipe unit 30A. The central axis of the external heater 432 coincides with the spiral axis 30r of the pipe unit 30A. The internal heater 431 and the external heater 432 are, for example, carbon-made heaters. Further, in the freeze vacuum drying apparatus 102, the pipe unit 30A is formed of glass, quartz, or the like. As a result, radiant heat emitted from the internal heater 431 and the external heater 432 is conducted to the inside of the pipe unit 30A.

In accordance with the freeze vacuum drying apparatus 102, the frozen particles 220 moving in the pipe unit 30A are heated by radiant heat (e.g., infrared ray) emitted from the internal heater 431 and the external heater 432, and sublimated and dried in the pipe unit 30A. Then, also in the freeze vacuum drying apparatus 102, the dried particles 230 are collected in the collection unit 50.

Modified Example 3

Figure 5:
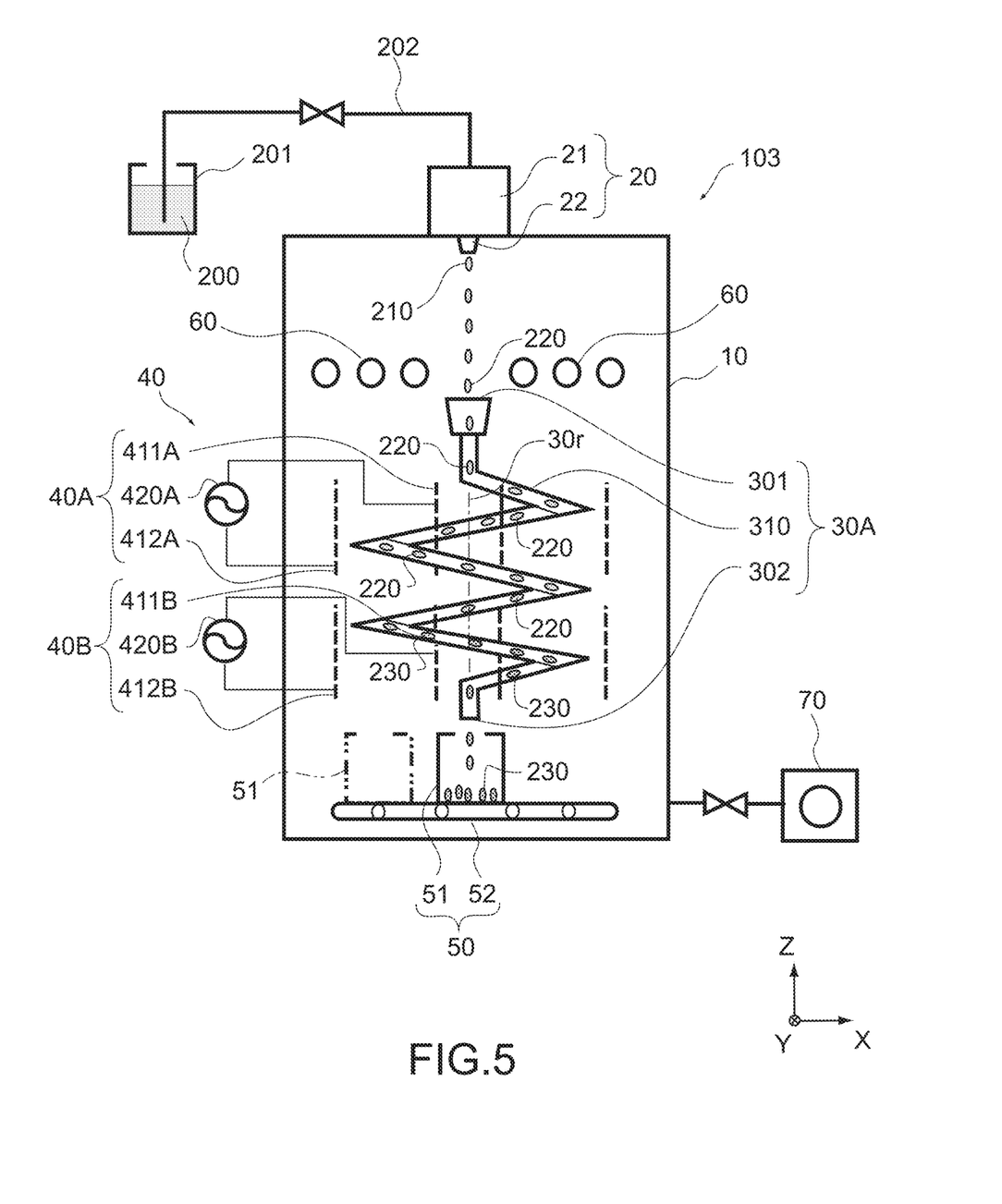

FIG. 5 is a schematic side view showing a modified example 3 of the freeze vacuum drying apparatus according to this embodiment.

In a freeze vacuum drying apparatus 103 shown in FIG. 5, the heating unit 40 includes a plurality of units, each of units is capable of independently heating the frozen particles 220. For example, the heating unit 40 includes an upper heating unit 40A and a lower heating unit 40B. Note that the number of the plurality of units is not limited to two, and may be three or more. Note that the pipe unit 30A may be replaced with the pipe unit 30B.

The upper heating unit 40A includes an upper internal electrode 411A, an upper external electrode 412A, and an upper high-frequency power source 420A. The lower heating unit 40B includes a lower internal electrode 411B, a lower external electrode 412B, and a lower high-frequency power source 420B. The upper heating unit 40A is separated from the lower heating unit 40B in the Z-axis direction.

The upper internal electrode 411A is, for example, a cylindrical mesh-electrode, and is disposed inside the upper part of the pipe unit 30A. Here, the upper part is the upper half of the pipe unit 30A. The central axis of the upper internal electrode 411A coincides with the spiral axis 30r of the pipe unit 30A. The upper external electrode 412A is, for example, a cylindrical mesh-electrode, and is disposed outside the upper side of the pipe unit 30A. The central axis of the upper external electrode 412A coincides with the spiral axis 30r of the pipe unit 30A. The upper high-frequency power source 420A applies a high-frequency electric field (200 KHz or 13.56 MHz) between the upper internal electrode 411A and the upper external electrode 412A.

The lower internal electrode 411B is, for example, a cylindrical mesh-electrode, and is disposed inside the lower part of the pipe unit 30A. Here, the lower part is the lower half of the pipe unit 30A. The central axis of the lower internal electrode 411B coincides with the spiral axis 30r of the pipe unit 30A. The lower external electrode 412B is, for example, a cylindrical mesh-electrode and is disposed outside the lower part of the pipe unit 30A. The central axis of the lower external electrode 412B coincides with the spiral axis 30r of the pipe unit 30A. The lower high-frequency power source 420B applies a high-frequency electric field (200 KHz or 13.56 MHz) between the lower internal electrode 411B and the lower external electrode 412B.

With such a configuration, it is possible to partially change the electric power to be input from the heating unit 40 to the pipe unit 30A with respect to the pipe unit 30A.

For example, by increasing the electric power to be input by the upper heating unit 40A rather than the lower heating unit 40B, the heating temperature in the upper part of the pipe unit 30A can be set higher than the heating temperature in the lower part of the pipe unit 30A. For example, during a term, in which the frozen particles 220 contain a lot of ice, from early term sublimation drying to middle term sublimation drying, the frozen particles 220 are dried by the upper heating unit 40A with higher input power. Then, after the middle term in which the ice-part of the frozen particles 220 has been reduced, the frozen particles 220 are sublimated and dried with lower input power by the lower heating unit 40B.

According to such a method, the time from early to mid-term sublimation drying in which the frozen particles 220 contain a lot of ice comes to be shortened, and substances except for water contained in the frozen particles 220 are less damaged by electric power in a stage after the mid-term in which the ice-part has been reduced. Therefore, the dried particles 230 with higher-quality can be obtained.

While embodiments of the present invention have been described above, it is needless to say that the present invention is not limited to the above-mentioned embodiments only, and various modifications can be made. Each embodiment is not limited to an independent form, and can be combined as much as possible in technology.

What is claimed is:

1. A freeze vacuum drying apparatus, comprising:
   a sprayer spraying a raw material liquid into a vacuum chamber;
   a pipe having a non-linear shape, including a first opening end and a second opening end, trapping frozen particles formed by self-freezing of liquid droplets via the first opening end, and the liquid droplets being formed by spraying the raw material liquid into the vacuum chamber;
   a heater sublimating and drying the frozen particles in the pipe by heating, the frozen particles moving in the pipe from the first opening end toward the second opening end by kinetic energy produced during spraying; and a collector collecting dried particles formed by sublimation drying of the frozen particles in the pipe and released from the second opening end of the pipe, the pipe having a turning axis in a direction from the sprayer toward the collector and turning spirally between the sprayer and the collector.

2. A freeze vacuum drying apparatus, comprising:

a sprayer spraying a raw material liquid into a vacuum chamber;

a pipe including a first opening end and a second opening end, wherein the pipe traps frozen particles via the first opening end, the frozen particles being formed by self-freezing of liquid droplets, and the liquid droplets being formed by spraying the raw material liquid into the vacuum chamber;

a heater sublimating and drying the frozen particles in the pipe by heating, the frozen particles moving in the pipe from the first opening end toward the second opening end by kinetic energy produced during spraying; and a collector collecting dried particles formed by sublimation drying of the frozen particles in the pipe and released from the second opening end of the pipe, wherein the pipe comprises turns such that a path of the frozen particles from the first opening end to the second opening end is winding, thereby allowing the frozen particles to dry into the dried particles between the first opening end and the second opening end.

3. The freeze vacuum drying apparatus according to claim 1, wherein the pipe includes at least one opening capable of releasing a gas to an outside of the pipe, the gas being generated by sublimation drying of the frozen particles between the first opening end and the second opening end while the frozen particles moving in the pipe.

4. The freeze vacuum drying apparatus according to claim 1, wherein the pipe is formed of a gas-permeable resin.

5. The freeze vacuum drying apparatus according to claim 1, wherein the heater includes a heating mechanism heating the frozen particles with a high frequency.

6. The freeze vacuum drying apparatus according to claim 1, wherein the heater includes a heating mechanism heating the frozen particles by thermal radiation.

7. The freeze vacuum drying apparatus according to claim 1, wherein the heater includes a plurality of units, and each of the plurality of units independently is capable of heating the frozen particles.

8. The freeze vacuum drying apparatus according to claim 1, further comprising a transporter capable of replacing the collector with another collector.

9. A freeze vacuum drying method, comprising:

spraying a raw material liquid into a vacuum chamber;

using a pipe having a non-linear shape, including a first opening end and a second opening end to trap frozen particles formed by self-freezing of liquid droplets via the first opening end, having a turning axis in a direction from the first opening end toward the second opening end and turning spirally between the first opening end and the second opening end, and the liquid droplets being formed by the spraying the raw material liquid into the vacuum chamber;

sublimating and drying the frozen particles in the pipe by heating, the frozen particles moving in the pipe from the first opening end toward the second opening end by kinetic energy produced during spraying; and collecting dried particles formed by sublimation drying of the frozen particles in the pipe and released from the second opening end of the pipe.

* * * * *